United States Patent Office 2,984,730
Patented May 16, 1961

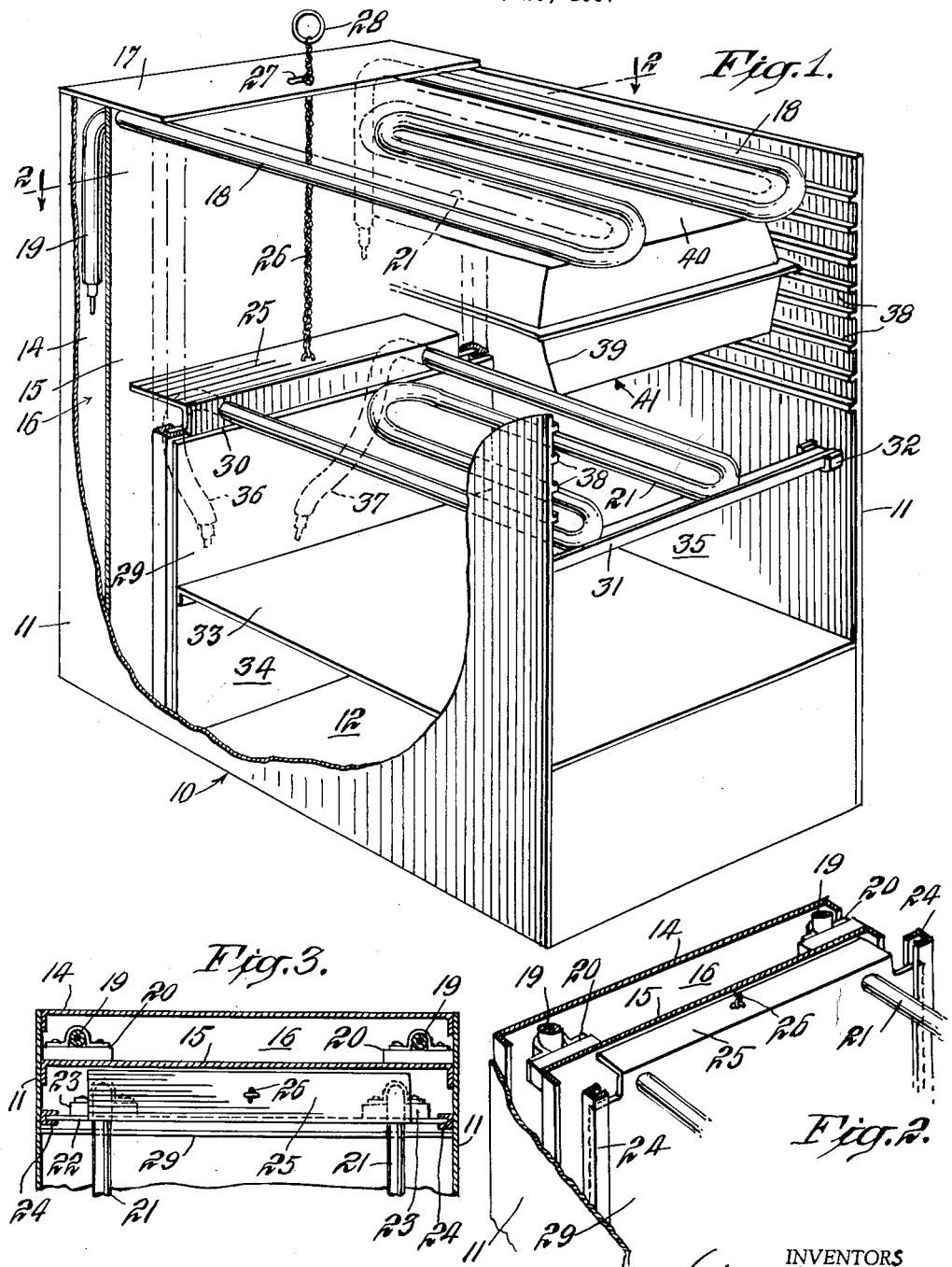

2,984,730

MULTI-PURPOSE COOKING UNIT

Erik Ostrom, Bromma, and Karl Henning Cederlund, sr, Lidingo, Sweden, assignors to Aktiebolaget Electrolux, Stockholm, Sweden, a corporation of Sweden Filed Feb. 26, 1957, Ser. No. 642,456

6 Claims. (Cl. 219—35)

Our invention relates to a multi-purpose cooking unit.

It is an object of our invention to provide an improved multi-purpose cooking unit with which a single or a variety of cooking operations may be performed at the same time.

Another object of our invention is to provide such an improved multi-purpose cooking unit which is portable and of simplified construction.

A further object of our invention is to provide an improved multi-purpose cooking unit having a plurality of heating elements one beneath the other which are vertically movable relative to one another, the top and next lower heating elements respectively being effective to emit heat downwardly and upwardly to a heating zone between the heating elements and the top heating element also being simultaneously effective to heat food held in vessels placed in thermal exchange relation with the top surface thereof.

Further objects and advantages of our invention will become apparent as the following description proceeds, and the features of novelty which characterize our invention will be pointed out with particularity in the claims annexed to and forming a part of this specification.

In the drawing:

Fig. 1 is a perspective view, partly broken away and in section, of a multi-purpose cooking unit embodying the invention;

Fig. 2 is a fragmentary sectional view taken at line 2—2 of Fig. 1; and

Fig. 3 is a fragmentary horizontal sectional view taken between the top and bottom heating elements of Fig. 1.

In Fig. 1 we have shown our invention embodied in a multi-purpose cooking unit comprising an outer shell 10 having spaced apart side walls 11, a bottom 12 and a rear wall 14. A vertical partition 15 at the rear of the shell 10 is fixed to the side walls 11 and cooperates with the rear wall 14 to form a rear space or compartment 16 having a top cover plate 17 which closes off the rear part of the shell only.

A heating element 18, which is in the form of a looped coil having straight sections and connecting bends, is positioned at the open top of shell 10 between the cover plate 17 and the front opening of the cooking unit. The heating element 18 may be supported in a fixed position in the shell 10 in any suitable manner. In the drawing the outer straight sections of the heating element 18, which pass through openings in the partition 15, are formed with downwardly extending portions 19 which may be mounted on the partition 15 and insulated therefrom in any suitable manner, as indicated at 20 in Figs. 2 and 3.

In accordance with our invention, we provide a second heating element 21 which may be adjusted to a number of different vertical positions below the heating element 18 or moved into close proximity therewith. In the preferred embodiment illustrated, the heating element 21 also is in the form of a looped coil having straight sections and connecting bends which cooperate with the looped coil forming the top heating element 18 to enable the bottom heating element to be moved into the same horizontal plane as the top heating element, as indicated by the dotted line in Fig. 1.

The outer straight sections of the heating element 21, which pass through openings in a vertical plate 22, are also formed with downwardly extending portions which may be mounted on the plate 22 and insulated therefrom in any suitable manner, as indicated at 23 in Fig. 3. The plate 21 is vertically movable in grooves formed in U-shaped members 24 which are fixed to the opposing side walls 11 and extend from the bottom 12 to the top cover plate 17 of the shell. The vertically movable plate 22 is provided with a top ledge or flange 25 to which is fixed the lower end of a metal chain 26 extending upwardly through an opening 27 in the top plate 17. By grasping a ring 28 fixed to the upper end of chain 26, the plate 22 can be raised or lowered to move the bottom heating element 21 to any desired position relative to the heating element 18. The opening 27 in the top plate 17 may be provided with a narrow slot capable of holding individual links of the chain and into which a link of the chain can be moved in order to hold the heating element 21 to any vertical position to which it is adjusted.

The plate 22 is vertically movable in the shell 10 at the rear of a short vertical partition 29 which is fixed to the opposing sides 11 and bottom 12 of the shell. The top edge 30 of the partition 29, which is located at a region intermediate the bottom 12 of the shell and the top heating element 18, serves as a stop which is in the path of movement of the movable heating element 21 and determines the lowermost position the heating element 21 can assume in the shell 10. The cover plate 17 serves as a stop which is in the path of movement of the flange 25 to limit upward movement of the plate 22 and heating element 21 mounted thereon.

As shown in Fig. 1, a support 31 may be provided for the forward part of heating element 21 when it is in its lowermost position in the shell 10. The support 31, which may be in the form of an angle member, is adapted to be held at its ends in holding members 32 fixed to the opposing side walls 11. The members 32 may be provided with U-shaped grooves to enable the support 31 to be removed from shell 10 and make it convenient to insert a baking or other cooking utensil in the shell 10 when desired.

A horizontal partition 33 which divides the shell 10 into compartments or spaces 34 and 35 is provided in front of the partition wall 29. The bottom space 34 may form a housing for suitable electric controls (not shown) for the cooking unit being described. It will be understood that the heating elements 18 and 21 may be arranged to be connected in any suitable manner to a source of electrical supply, and that the heating element 21 is connected to suitable electrical conductors which are flexible, as indicated at 36 and 37 in Fig. 1, to enable the heating element 21 to be moved vertically in the shell 10. It will be understood, also, that telescopically connected members (not shown) may be provided at the rear of partition wall 29 which form a part of the electrical circuit for supplying electrical energy to heating element 21 and permit the latter to move vertically in the space 35.

The opposite side walls 11 of the shell 10 are provided with guides or rails 38 beneath one another for supporting the flanges of a rectangular-shaped vessel or pan 39. A vessel 40 similar to pan 39 may be placed in an inverted position over the latter to form an oven 41 which can be adjusted to different vertical positions on the guides or rails 38 in compartment 35.

When the heating elements 18 and 21 are energized, a number of cooking operations may be carried on at the same time. The top heating element 18 may be employed as a surface heating element for pan broiling or heating food or liquid in a saucepan, double boiler or kettle, for example. While the heating element 18 is being used as a surface heating element for a useful cooking purpose, the upper section of space 35 between the heating elements 18 and 21 may be advantageously employed to bake food in an enclosure like the oven 41, the latter receiving heat from both of the heating elements.

Further, while heating of oven 41 is being effected by both of the heating elements 18 and 21, food to be broiled may be placed in the bottom section of space 35 beneath the heating element 21. If desired, guides or rails similar to the rails 38 may be provided at the side walls 11 between the support 31 and horizontal partition 33 for supporting a broiler at different vertical positions beneath the bottom heating element 21.

Also, a flat sheet may be supported on the guides or rails 38 beneath the top heating element 18 so that both the heating element 18 and the heating element 21 can be employed simultaneously to cook food in saucepans and the like on their top surfaces and to broil food at their undersides.

Further, the bottom heating element 21 may not only be adjusted to different vertical positions to accomplish any useful cooking purpose by itself or in combination with the top heating element 18 but also may be moved essentially into the same horizontally disposed plane as the top heating element 18, the heating elements being moved into overlapping relation. Under these conditions, a heating element of increased size at the top of the casing 10 is available for surface cooking and heating and for broiling at its underside. By providing heating elements 18 and 21 in the form of looped coils, the top heating element 18 in effect is apertured to receive the heating element 21 when the latter is moved upwardly to its highest position.

In view of the foregoing, it will now be understood that we have provided a portable multi-purpose cooking unit which is extremely compact and can be used for a variety of useful cooking purposes at the same time. This is effectively accomplished by providing a construction in which heat emitted upwardly and downwardly from opposing faces of each heating element may be employed simultaneously for useful heating purposes. The top and bottom heating elements 18 and 21 thus are capable of heating a zone between the heating elements and the top heating element 18 can be used at the same time to heat food held in vessels placed in thermal exchange relation with the top surface thereof.

By moving the heating element 21 up or down in the space 35, the rate at which the oven 41 is heated may be controlled. Further, such movement of the bottom heating element 21 may be effectively utilized to regulate the distance between it and food to be broiled at the underside thereof. It will be understood, of course, that conventional controls (not shown) may be provided to control the supply of electrical energy to each heating element.

Although we have illustrated and described a particular embodiment of our invention, we do not desire to be limited to the particular arrangement set forth, and we intend in the following claims to cover all modifications which do not depart from the spirit and scope of our invention.

What we claim is:

1. In a cooking unit of the class described, the combination of a first horizontally disposed electrical surface heating means which provides a rigid support for supporting a receptacle thereon, structure providing a heating zone, said first surface heating means being arranged to emit heat downwardly therefrom into said heating zone, a second horizontally disposed electrical surface heating means which provides a rigid support for supporting a receptacle thereon, said second surface heating means in one position being disposed beneath said first surface heating means and arranged to emit heat upwardly into said heating zone, and means for moving said second surface heating means vertically upward and downward between said first position and a second higher position at which said first surface heating means is disposed, said first surface heating means being apertured to receive said second surface heating means when the latter is moved to its second higher position.

2. A cooking unit as set forth in claim 1 in which each of said surface heating means comprises a looped coil having a number of adjacent U-shaped loops, the opposing sides of said apertured first surface heating means providing openings in which the U-shaped loops of said second surface heating means are located when the latter is moved upwardly to the second higher position.

3. In a cooking unit of the class described, the combination of a first horizontally disposed surface heating member operable to emit heat upwardly and downwardly therefrom, a second horizontally disposed surface heating member which is beneath said first surface heating member and operable to emit heat upwardly therefrom, means providing a heating zone which receives heat emitted downwardly and upwardly from said first and second surface heating members, respectively, and structure whereby at least one of said surface heating members is vertically movable relative to said other surface heating member, said surface heating members being so constructed and arranged that at least one of said surface heating members is vertically movable to bring said members into overlapping relation essentially in the same horizontally disposed plane.

4. In a cooking unit of the class described, the combination of a casing providing a heating zone having spaced side walls and front and top openings, first and second electrical surface heating means operable to emit heat upwardly and downwardly therefrom, means for supporting said first and second electrical surface heating means essentially in the same horizontally disposed plane at the vicinity of the top opening of said heating zone in close proximity to one another to provide essentially a single surface heater, said heating zone receiving heat emitted downwardly from said first and second electrical surface heating means at the vicinity of the top opening, and structure whereby said second electrical surface heating means is movable from the vicinity of the top opening to a lower position, said second electrical surface heating means being operable to emit heat upwardly therefrom into said heating zone when it is moved from the vicinity of the top opening to its lower position.

5. In a cooking range of the class described, means providing a heating zone having an opening at the top of the range, a first surface heating member which is mounted at the opening at the top of the range and emits heat upwardly and also downwardly into said heating zone, a second surface heating member which is disposed beneath said first surface heating member and emits heat upwardly into said heating zone, and structure whereby said second surface heating member is vertically movable relative to said first surface heating member, said surface heating members being so constructed and arranged that said second surface heating member is movable to a vertical position at the top of the range to bring said first and second surface heating members essentially into the same horizontally disposed plane.

6. In a cooking range of the class described, the combination of first and second horizontally disposed heating members operable to emit heat upwardly and downwardly therefrom, means for supporting said first and second heating members essentially in the same horizontally disposed plane at a first vertical position at the top of the range in close proximity to one another to provide essentially a single surface heater, means providing a heating zone which receives heat emitted downwardly from said first and second heating members at the first vertical position, and structure whereby said second heating member is movable from said first vertical position to a lower vertical position, said second heating member being operable to emit heat upwardly therefrom into said heating zone when it is moved from its first to its second lower vertical position.

References Cited in the file of this patent

UNITED STATES PATENTS

| | | |
|---|---|---|
| 730,252 | Gold | June 9, 1903 |
| 1,010,169 | Norbeck | Nov. 28, 1911 |
| 1,118,454 | Weeks | Nov. 24, 1914 |
| 1,376,829 | Phelps | May 3, 1921 |
| 1,392,802 | Serrell | Oct. 4, 1921 |
| 1,552,335 | Mottlau | Sept. 1, 1925 |
| 2,024,386 | Phelps | Dec. 17, 1935 |
| 2,272,658 | Challet | Feb. 10, 1942 |
| 2,288,967 | Challet | July 7, 1942 |
| 2,331,707 | Lotter | Oct. 12, 1943 |
| 2,836,697 | Jordan | May 27, 1958 |

FOREIGN PATENTS

| | | |
|---|---|---|
| 93,215 | Switzerland | Mar. 1, 1922 |